(12) United States Patent
Stevens

(10) Patent No.: US 6,882,989 B2
(45) Date of Patent: Apr. 19, 2005

(54) GENETIC ALGORITHM TECHNIQUES AND APPLICATIONS

(75) Inventor: Soraya Rana Stevens, Worcester, MA (US)

(73) Assignee: BBNT Solutions LLC, Cambridge, MA (US)

( * ) Notice: Subject to any disclaimer, the term of this patent is extended or adjusted under 35 U.S.C. 154(b) by 696 days.

(21) Appl. No.: 09/792,243

(22) Filed: Feb. 23, 2001

(65) Prior Publication Data

US 2002/0120407 A1 Aug. 29, 2002

(51) Int. Cl.[7] ............................................. G06F 15/18
(52) U.S. Cl. ....................................................... 706/13
(58) Field of Search ................................ 706/13; 705/8

(56) References Cited

U.S. PATENT DOCUMENTS

| | | | | |
|---|---|---|---|---|
| 5,140,530 A | * | 8/1992 | Guha et al. ................... | 706/13 |
| 5,319,781 A | * | 6/1994 | Syswerda ...................... | 705/8 |
| 5,390,282 A | * | 2/1995 | Koza et al. ................... | 706/13 |
| 5,848,403 A | * | 12/1998 | Gabriner et al. ............. | 706/13 |
| 6,490,566 B1 | * | 12/2002 | Schmidt ....................... | 705/8 |

OTHER PUBLICATIONS

Darrell Whitley, Timothy Starkweather, and D'Ann Fuquay, Schdeuling Problems and Traveling Salesmen: The Genetic Edge Recombination Operator, Proceedings of the Third International Conference on Genetic Algorithms, Morgan Kaufman, 1989.*

T. Starkweather, S. McDaniel, K. Mathias, D. Whitley and C. Whitley, A Comparison of Genetic Sequencing Operators, Proceeding of the Fourth International Conference on Genetic Algorithms, Morgan Kaufman, 1991, pp. 69–76.*

Gilbert Syswerda and Jeff Palmucci, The Application of Genetic Algorithms to Resource Scheduling, Proceeding of the Fourth International Conference on Genetic Algorithms, Morgan Kaufman, 1991.*

Ioannis T. Christou, Armand Zakarian, Jun–Min Liu, Helen Carter, A Two–Phase Genetic Algorithm for Parge–Scale Bidline–Generation Problems at Delta Air Lines, Finalist Paper Daniel H. Wagner Award for Excellence in Operations Research Practise, 1998.*

Larry Eshelman, The CHC Adaptive Search Algorithm: How to Have Safe Search When Engaging in Nontraditional Genetic Recombination, Foundations of Genetic Algorithms, Morgan Kaufman 1991, pp. 265–283.*

Gilbert Syswerda, Uniform Crossover in Genetic Algorithms, Proceeding of the Third International Conference on Genetic Algorithms, Dec. 1989, George Mason University, pp. 2–9.*

John H. Holland, Adaption in Natural and Artificial Systems, MIT Press, Cambridge, MA 1992.*

Ayed A. Salman, Kishan G. Mehrotra, and Chilukuri K. Mohan, Adaptive Lingage Crossover, Technical Report SU–EECS TR 97–2, Department of EECS, Syracuse University, Aug. 1997.*

(Continued)

Primary Examiner—Anthony Knight
Assistant Examiner—Michael B. Holmes
(74) Attorney, Agent, or Firm—Ropes & Gray LLP

(57) ABSTRACT

Disclosed herein are genetic algorithm techniques and applications. The techniques and applications disclosed include a method of generating offspring having feasible gene traits selected from parent chromosomes, a method of assigning tasks to resources, and a method of determining feasible gene traits for a chromosome, for example, to mutate a gene to a feasible trait.

34 Claims, 18 Drawing Sheets

OTHER PUBLICATIONS

Whitley, Starkweather, and Fuquay. Scheduling Problems and Traveling Salesmen: The Genetic Edge Recombination Operator, Proceedings of the Third International Conference on Genetic Algorithms, Morgan Kaufmann, 1989.

Starkweather, McDaniel, Mathias, Whitley, and Whitley, A Comparison of Genetic Sequencing Operators, Proceedings of the Fourth International Conference on Genetic Algorithms, Morgan Kaufmann, 1991, pp 69–76.

Larry Eshelman, The CHC Adaptive Search Algorithm. How to Have Safe Search When Engaging in Nontraditional Genetic Recombination, Foundations of Genetic Algorithms, Morgan Kaufmann 1991, pp 265–283.

Christou, Zakarian, Liu, and Carter, A Two Phase Genetic Algorithm for Solving Large Scale BidLine Generation Problems, Finalist Paper for the Daniel H. Wagner Award for Excellence in Operations Research Practise, Sep. 1998. (at www.cs.wisc.edu/~christou/publications.html).

Syswerda and Palmucci, The Application of Genetic Algorithms to Resource Scheduling, Proceedings of the Fourth International Conference on Genetic Algorithms, Morgan Kaufmann, 1991.

* cited by examiner

SOLUTION: 1 1 2 1 0 0

| INDIVIDUAL | CHROMOSOMES | FITNESS |
|---|---|---|
| A | 0 1 2 0 2 1 | 2 |
| B | 1 1 2 0 2 2 | 3 |
| C | 0 0 1 2 1 0 | 1 |
| D | 0 2 1 0 1 2 | 0 |

254  Feasible for Task 3: A, B, and C

256  Feasible for Task 1: A, B, and C

258  Feasible for Task 4: A, B, and C

260  Feasible for Task 2: C

GENETIC ALGORITHM TECHNIQUES AND APPLICATIONS

REFERENCE TO GOVERNMENT FUNDING

This work was funded under U.S. government contract DCA100-96-D-0048. The U.S. government may have certain rights in the invention.

BACKGROUND OF THE INVENTION

1. Field of the Invention

The invention relates to genetic algorithm techniques and applications.

2. Description of Related Art

Genetic algorithms evolve solutions to problems using properties of natural selection. Generally, a genetic algorithm starts with a population of attempted solutions to a problem, evaluates the attempted solutions, and uses the better solutions as the basis of a next generation of attempted solutions. Typically, the process continues until some satisfactory solution emerges. Genetic algorithms have produced solutions for a wide variety of problems such as numerical optimization, circuit layout, and so forth.

As an example of a genetic algorithm, FIGS. 1–4 illustrate a genetic algorithm that "guesses" six randomly chosen numbers 100. FIG. 1 shows an initial population 110 of attempted solutions. The population includes individuals 104 A, B, C, and D. Each individual has an associated chromosome 106. Each chromosome 106 includes a series of genes. In the example shown, each gene represents a different guessed digit. In genetic algorithm terminology, the value of a particular gene is known as its "trait"; possible traits (e.g., digits 0 to 9) are known as "alleles"; and the position of a gene within a chromosome is known as its "locus."

As shown in FIG. 1, some chromosomes 106 in the initial population came closer to guessing the solution 100 than others. A fitness measure 108 represents how closely each chromosome 106 came to the solution 100. In this case, the fitness measure 108 represents how many correct digits a chromosome 106 includes. For example, individual A, having a chromosome of "0 1 2 0 2 1", has two correctly placed digits, underlined, of the solution sequence "1 1 2 1 0 0" 100 and, thus, has a fitness measure of "2". Individual B shares three digits with the solution 100, and, thus, has a fitness measure 108 of "3". None of the individuals, however, exactly match the solution 100.

To generate another generation of individuals, genetic algorithms commonly operate on existing individuals having better fitness measures. For example, a genetic algorithm can mutate genes of an existing individual.

FIG. 2 shows an example of mutation. As shown, a genetic algorithm has generated a new individual, E, by mutating the last gene of individual A from a "1" 114 to a "0" 116.

Genetic algorithms also commonly use a "crossover" operation to generate offspring. In crossover, parents exchange genetic material to create an offspring. For example, as shown in FIG. 3, two parents, B and C, generate offspring F by contributing the first four digits 118 of individual B and the last two digits 120 of individual C. Thus, the fifth gene represents a crossover point. Commonly, genetic algorithms randomly select one or more crossover points when generating offspring.

FIG. 4 shows the population 110 after the generation of offspring shown in FIGS. 2 and 3, and the elimination of chromosomes having the poorest fitness measures (i.e., individuals C and D in FIG. 1). The offspring shown, individuals E and F, have better fitness measures 108 than their parents. The average fitness measure for the population has also increased. While offspring sometime offer poorer fitness measures than their parent(s), repeated fitness based selection and offspring generation tends to increase the fitness measures of a population. The genetic algorithm may continue generating and measuring the fitness of chromosomes, for example, until a chromosome exactly matches the solution 100.

SUMMARY OF THE INVENTION

Disclosed herein are genetic algorithm techniques and applications. The techniques and applications disclosed include a method of generating offspring having feasible gene traits selected from parent chromosomes. For example, a "constraint-based crossover" operator can select feasible gene traits from parents contributing genetic material. The techniques and applications disclosed herein also include a method of assigning tasks to resources that represents resources as alleles and tasks as chromosome loci. The techniques and applications disclosed herein also include a method of determining feasible gene traits for a chromosome, for example, to mutate a gene to a feasible trait.

Advantages will become apparent in view of the following detailed description, including the figures, and the claims.

BRIEF DESCRIPTION OF THE DRAWINGS

FIG. 1 is a prior art diagram illustrating a chromosome population.

FIGS. 17–19 are screenshots of a user interface for a computer program that schedules resources to tasks.

DETAILED DESCRIPTION OF THE PREFERRED EMBODIMENT(S)

Described herein are a variety of techniques that can speed a genetic algorithm's search for a solution to a problem. To illustrate these techniques, this description describes a genetic algorithm approach to a scheduling problem. The techniques described herein, however, may be applied to a variety of different problems.

Figure 2:
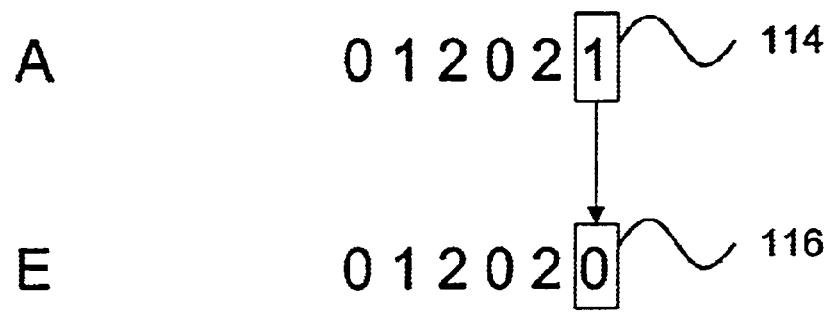
FIG. 2 is a prior art diagram illustrating mutation.
Figure 3:
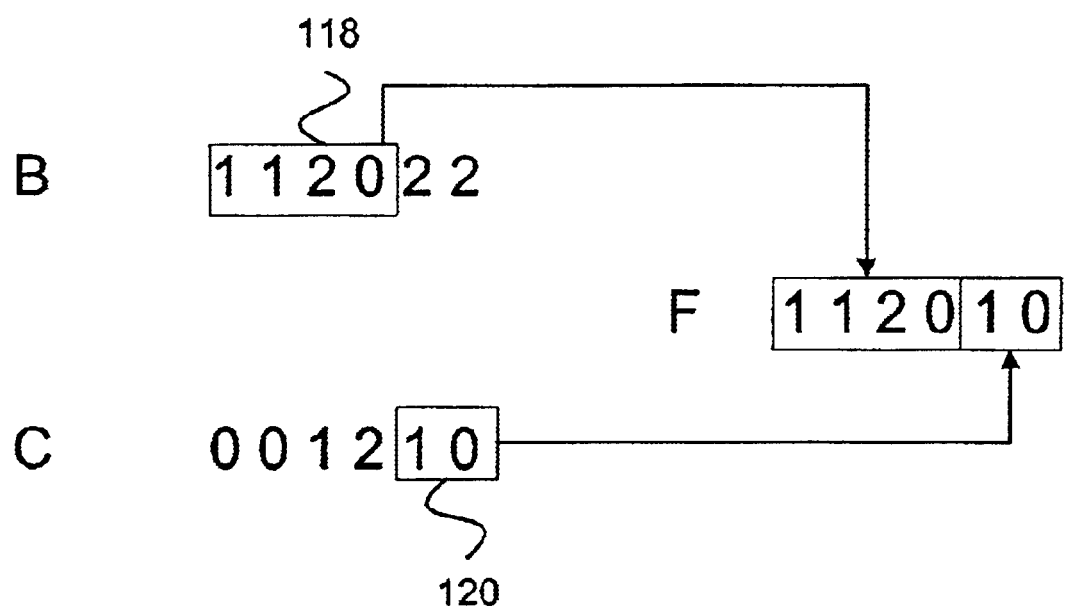
FIG. 3 is a prior art diagram illustrating crossover.
Figure 4:
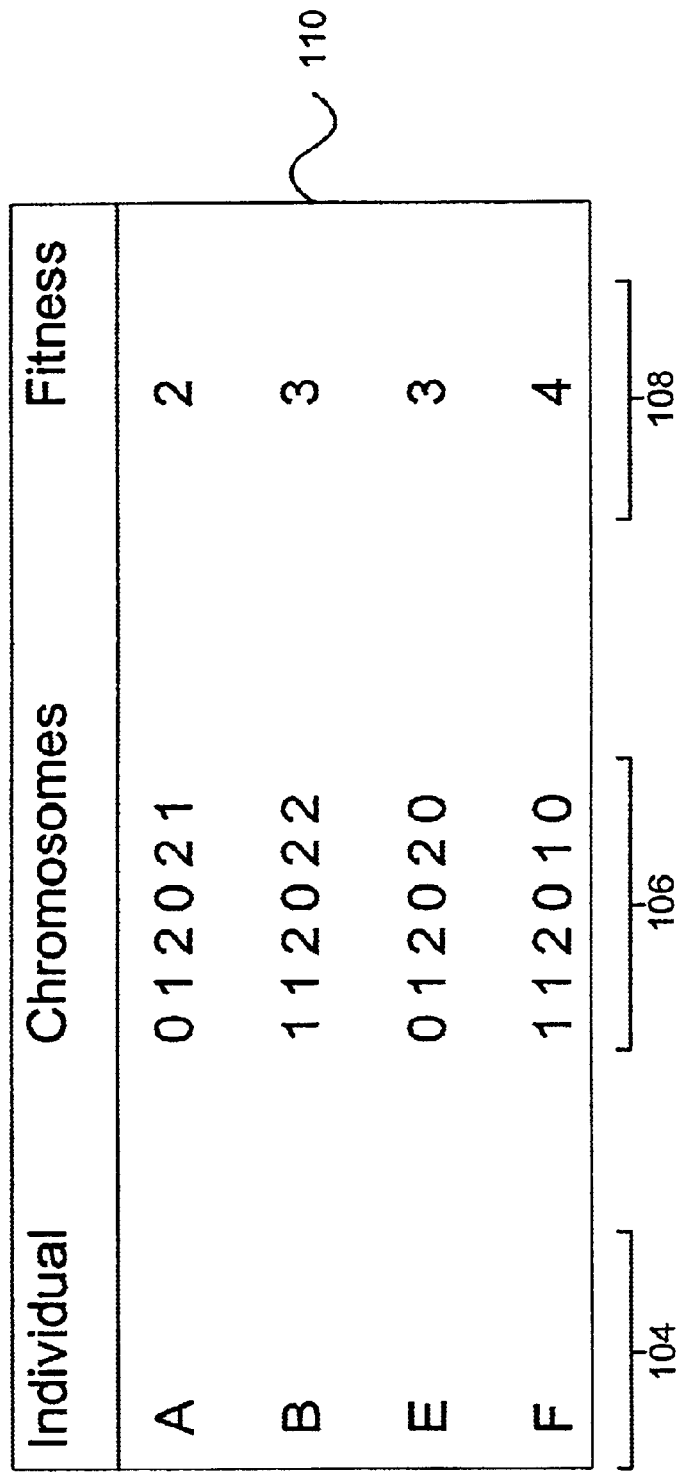
FIG. 4 is a prior art diagram illustrating improved chromosome fitness.
Figure 5:
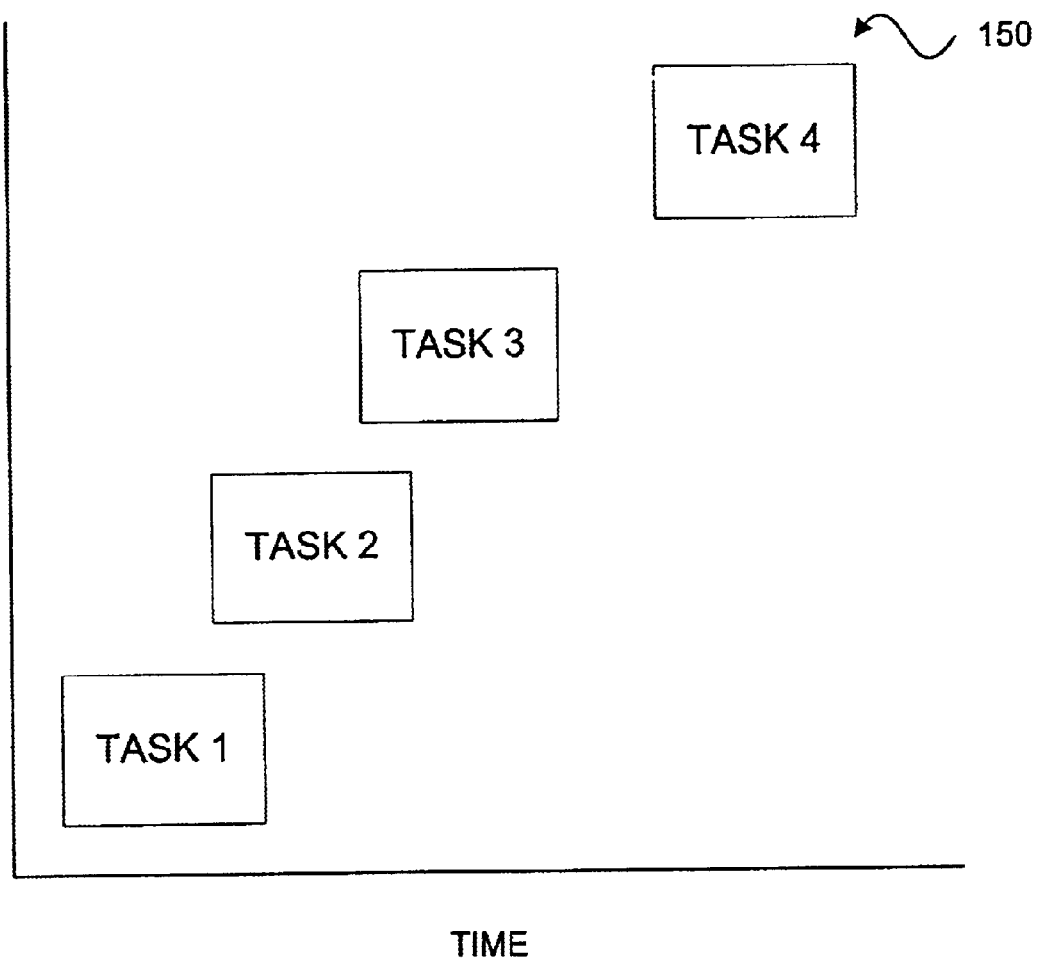
FIG. 5 is a diagram illustrating a scheduling problem.

FIG. 5 illustrates a scheduling problem. As shown, a set 150 of tasks, 1 to 4, occur over different time periods. Some tasks 150 overlap one another in time. For example, the end of task 1 overlaps the beginning of task 2. Scheduling involves assigning a resource 152 to a task. Such scheduling may be subject to different requirements or "hard constraints". For example, it may not be feasible for a single resource 152 to handle more than one task at a time.

Figure 6:
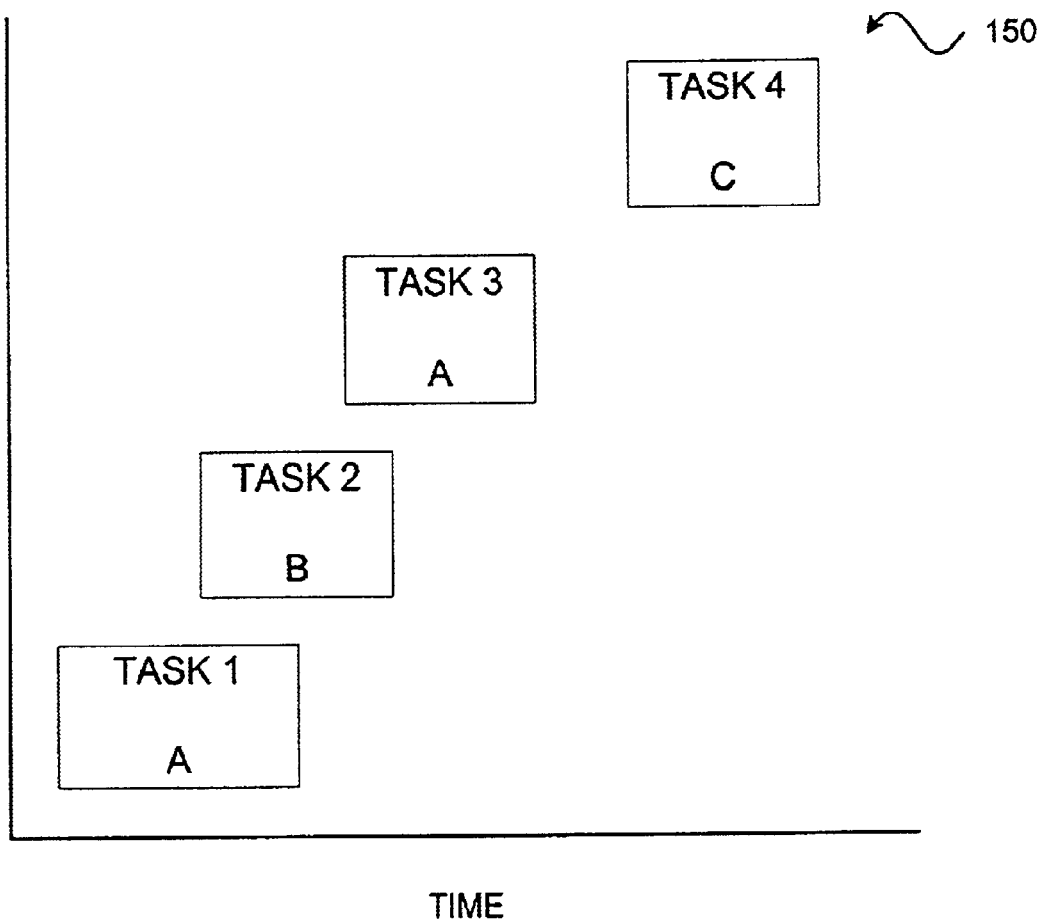
FIG. 6 is a diagram illustrating a chromosome's solution to a scheduling problem.
Figure 6:
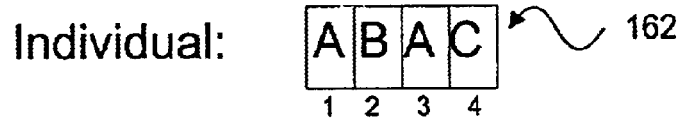

FIG. 6 illustrates a feasible solution to the scheduling problem that satisfies a hard constraint against assigning resources to contemporaneous tasks. As shown, resource A is assigned to tasks 1 and 3, resource B is assigned to task 2, and resource C is assigned to task 4. In this solution, no resource is assigned to two different tasks that occur at the same time.

A chromosome 162 represents the solution shown in FIG. 6. The trait of each gene of the chromosome 162 specifies a particular resource. The locus, or position, of each gene corresponds to one of the tasks. For example, as shown, the first gene of the chromosome 162 has as a trait of "A". Thus, the first gene specifies an assignment of resource A to task 1. The remaining genes similarly assign resource B to task 2, resource A to task 3, and resource C to task 4. Chromosome 162 represents a feasible solution. That is, no resource assignment violates the hard constraint.

Identification of a task/resource pairing using alleles that specify different resources permits a single expression of each set of possible resource/task assignments. That is, a chromosome of "ABAC" constitutes the only way to assign resource A to tasks 1 and 3, resource B to task 2, and resource C to task 4. Restricting each set of assignments to a single representation greatly reduces the solution search space and reduces the computational demands typically associated with genetic algorithms.

Figure 7:
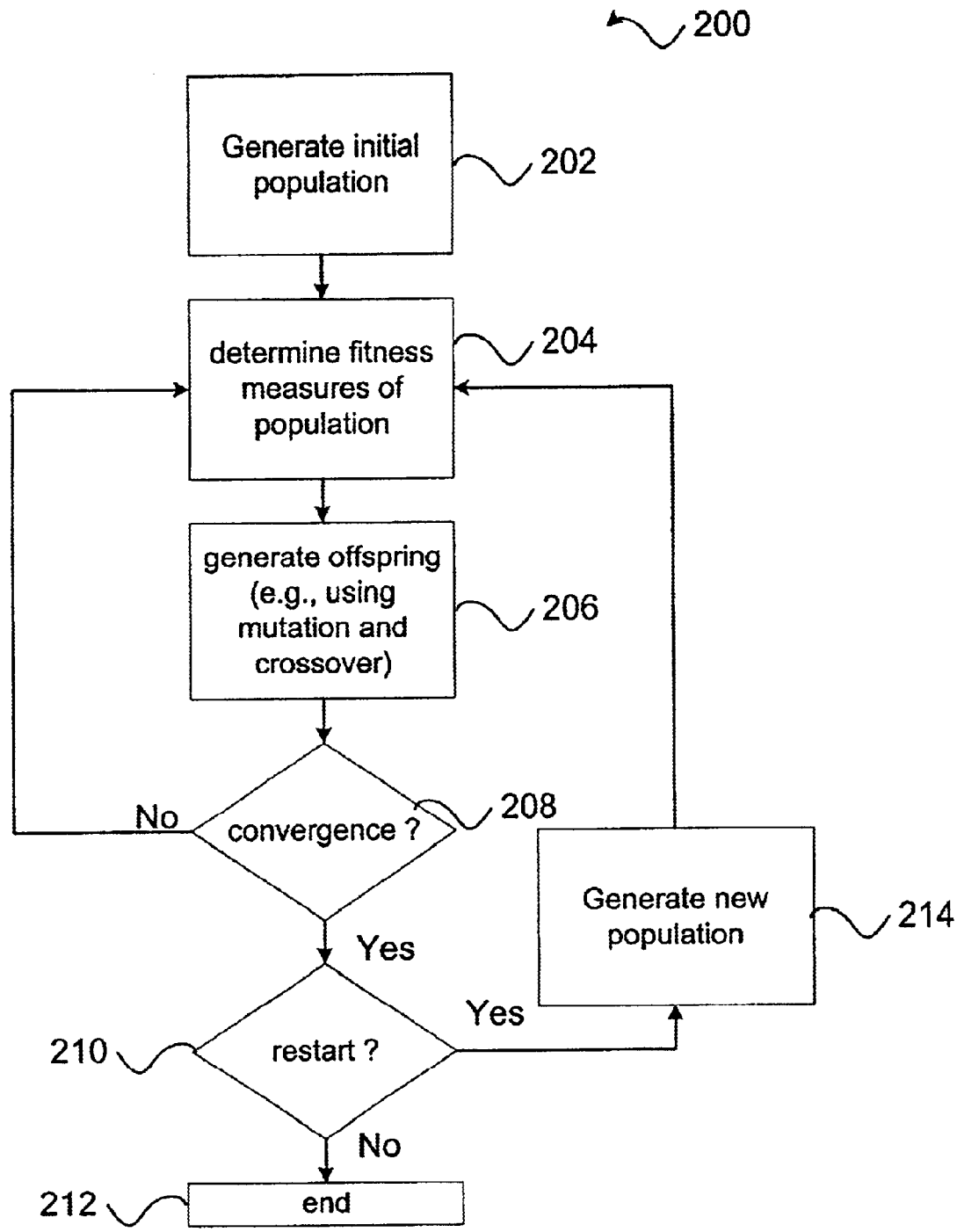
FIG. 7 is a flowchart of a genetic algorithm process.

FIG. 7 illustrates a genetic algorithm process 200 for determining a solution to a problem. Process 200 begins with generation 202 of an initial population of chromosomes. The initial population may include, for example, thirty non-duplicate chromosomes.

Process 200 then determines 204 a fitness measure for each chromosome. Based on this fitness measure, process 200 selects individuals in the population for inclusion in a next generation and/or for siring offspring. For example, process 200 may use mutation and/or crossover operations to generate offspring 206. Typically, the overall fitness of a population will begin to converge 208. Process 200 can determine convergence 208 in a number of ways. For example, process 200 can determine convergence 208 has occurred when a number of duplicate individuals exceeds some threshold (e.g., 40). Similarly, process 200 can determine convergence 208 has occurred when the age of the fittest individual exceeds some threshold (e.g., 10 generations). Cycle 204, 206 can repeat if convergence 208 does not occur.

After process 200 detects convergence 208, process 200 may determine 210 whether to perform a partial restart 214. For example, process 200 may perform a pre-determined number (e.g., 5) of partial restarts 214 before terminating 212. Alternatively, process 200 may perform a partial restart 214 if improvements to the population's fitness (e.g., average fitness or the fitness of the fittest chromosome) indicate sufficient improvement over a previous generation. Partial restarting 214 may involve generating some individuals (e.g., 10 individuals) from scratch and basing the remaining individuals on the chromosome currently having the best fitness measure. For example, process 200 may make several copies of the most fit chromosome and mutate a certain percentage (e.g., 50%) of its genes.

Aspects of process 200 conform to CHC (Cross-Generational Selection, Heterogeneous Recombination, and Cataclysmic Mutation). However, the techniques described herein may be used in a wide variety of genetic algorithm processes.

Figure 8:
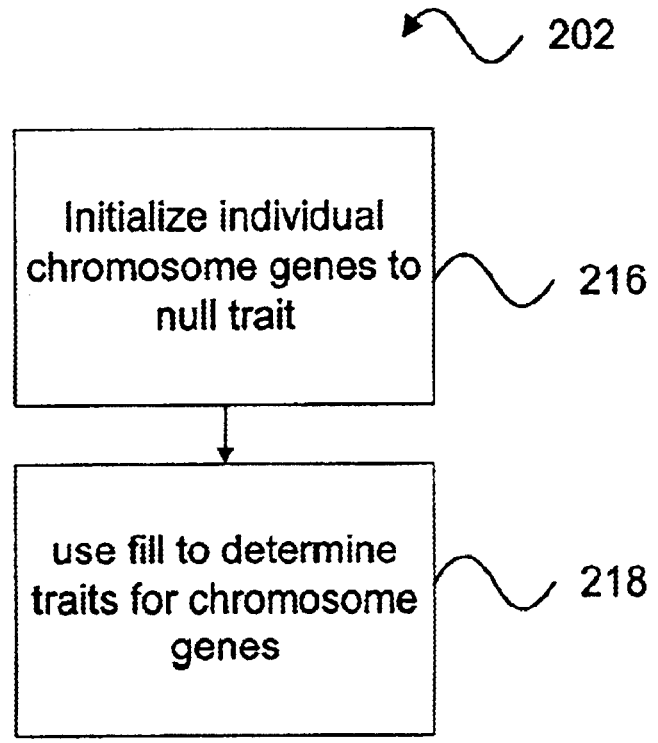
FIG. 8 is a flowchart of a process for creating a chromosome having feasible gene traits.

FIG. 8 illustrates a process 202 for generating an initial population. In addition to alleles specifying resources, process 202 uses an additional allele known as a "null allele." For the scheduling problem, the gene having a null trait represents a task having no assigned resource.

To generate an individual, process 202 sets 216 all gene traits to the null allele. A "fill" process 218 attempts to change each null trait to a non-null trait. That is, for each gene having the null trait, fill process 218 tries to identify a resource that can feasibly handle the task represented by the gene's locus. Fill process 218 may not always succeed in identifying a feasible trait. Therefore, even after fill process 218 completes, a chromosome may include a gene having the null trait. However, replacing null traits with non-null feasible traits can ensure that each chromosome satisfies hard constraints.

Figure 9:
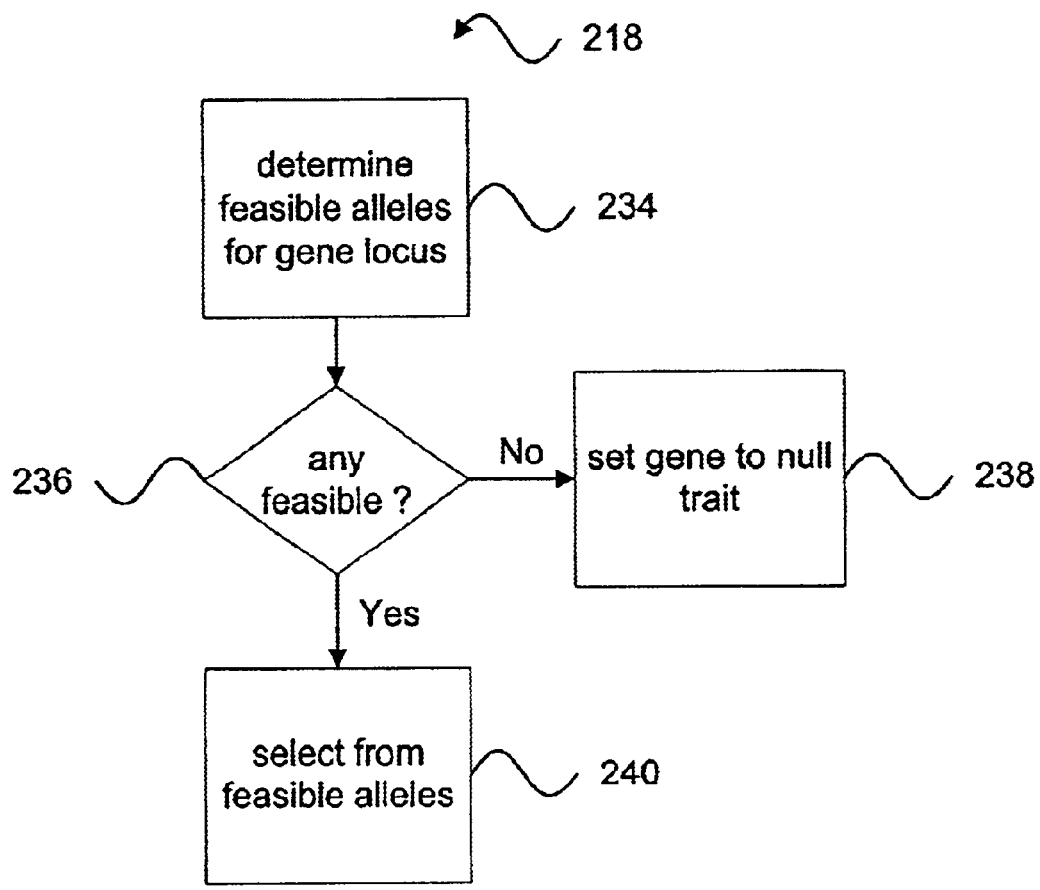
FIG. 9 is a flowchart of a process for identifying feasible gene traits.

FIG. 9 illustrates a fill process 218 in greater detail. Again, process 218 operates on chromosome genes having a null trait. For example, process 218 may identify (not shown) genes having the null trait. For each identified gene having the null trait, process 218 determines 234 feasible replacement traits. For example, in the case of the scheduling problem of FIGS. 5 and 6, fill process 218 may identify feasible resources for handling the task associated with a particular gene. If feasible alleles exist 236, process 218 can select 240 from the feasible alleles; otherwise, the gene trait remains 238 null.

Figure 10:
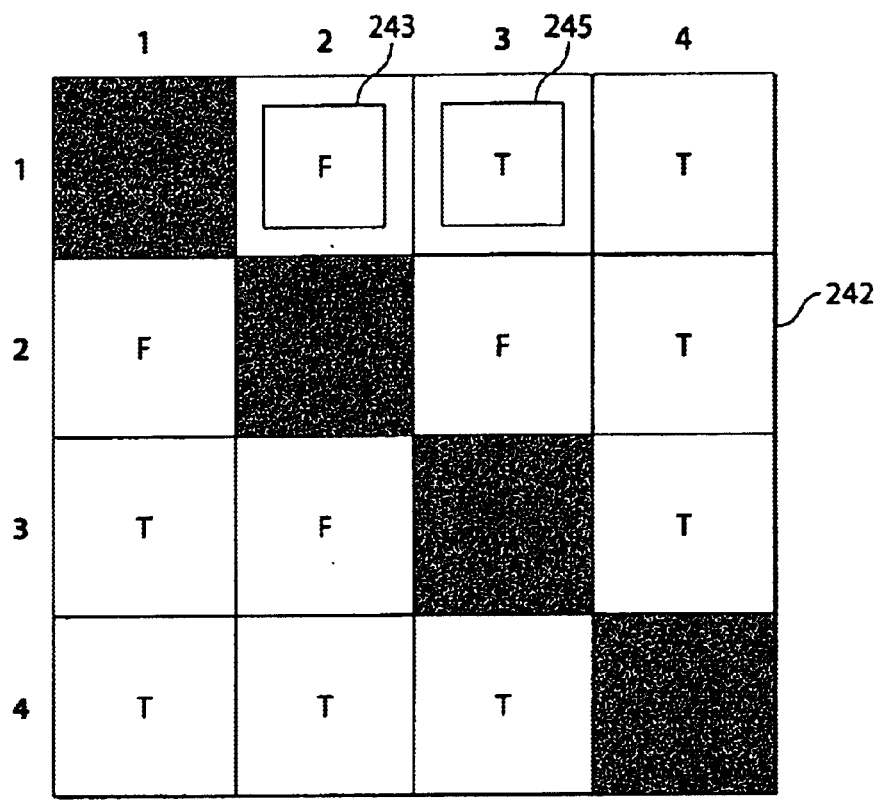
FIGS. 10–11 are diagrams of data that can be used to identify feasible gene traits.
Figure 11:
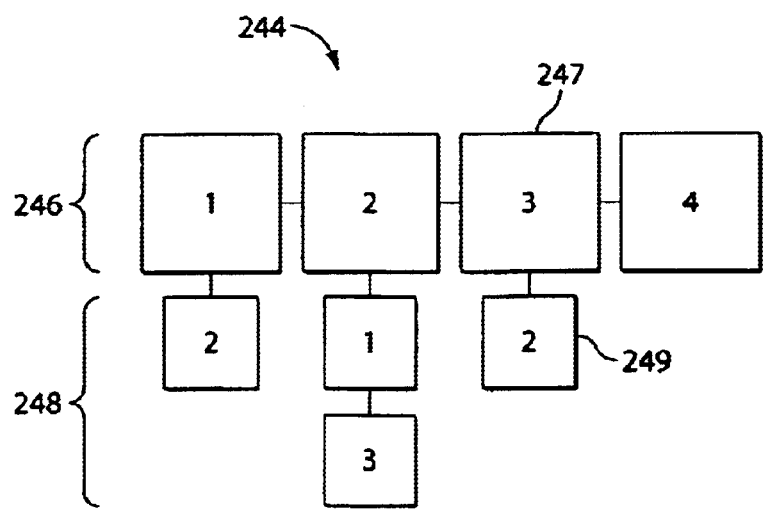

FIGS. 10 and 11 illustrate a couple of the many different ways of representing constraints. Both enable quick identification of infeasible resources.

In particular, FIG. 10 shows an adjacency matrix 242. The rows and columns of the matrix 242 both represent tasks. Each matrix 242 cell includes a Boolean indication of whether a resource can handle the two tasks identified by the row and column coordinates of the cell. For example, the Boolean "false" value of cell 243 indicates that a resource cannot feasibly handle task 1 (the row index) and task 2 (the column index). Similarly, the Boolean "true" value of cell 245 indicates that a resource can feasibly handle both task 1 and task 3.

FIG. 11 shows another representation 244 of a hard scheduling constraint. Representation 244 includes nodes 246 representing each task and children 248 representing conflicting tasks. For example, the node 247 corresponding to task 3 has a "task 2" child 249 indicating that a resource cannot feasibly handle both task 3 and task 2. A process, such as fill process 218, can quickly traverse the graph 244 to detect conflicting tasks.

Fill process 218 can be used in a variety of contexts. For example, as shown above, fill process 218 can be used during individual creation, to identify feasible mutations, and to fill the results of an attempted crossover that did not satisfy hard constraints.

Figure 12:
FIG. 12 is a diagram illustrating chromosome creation.
Figure 12:
Figure 12:
Figure 12:
Figure 12:
Figure 12:

FIG. 12 illustrates creation of an individual using fill process 218. Fill process 218 determines gene traits over several stages 252–262. As shown, each gene 252 of the created individual initially has the null trait, represented with an "X". Fill process 218 first selects a gene to fill. For example, at a first stage 254, fill process 218 randomly selects the gene at the third locus. FIG. 12 depicts genes selected for filling with a "?".

For the gene at the selected locus, process 218 determines feasible resources. In this case, the hard constraints render resource alleles A, B, and C feasible. Fill process 218 selects a gene trait from these feasible traits. For example, as shown in stage 256, fill process 218 randomly selects resource "B" as the trait of the gene at locus three.

Fill process 218 continues selecting feasible gene traits for chromosome genes having the null trait (stages 254–262). In the case shown, fill process 218 eventually (stage 262) selects non-null alleles for each gene. However, in other circumstances, fill process 218 may fail to eliminate all null traits from the chromosome 262.

Figure 13:
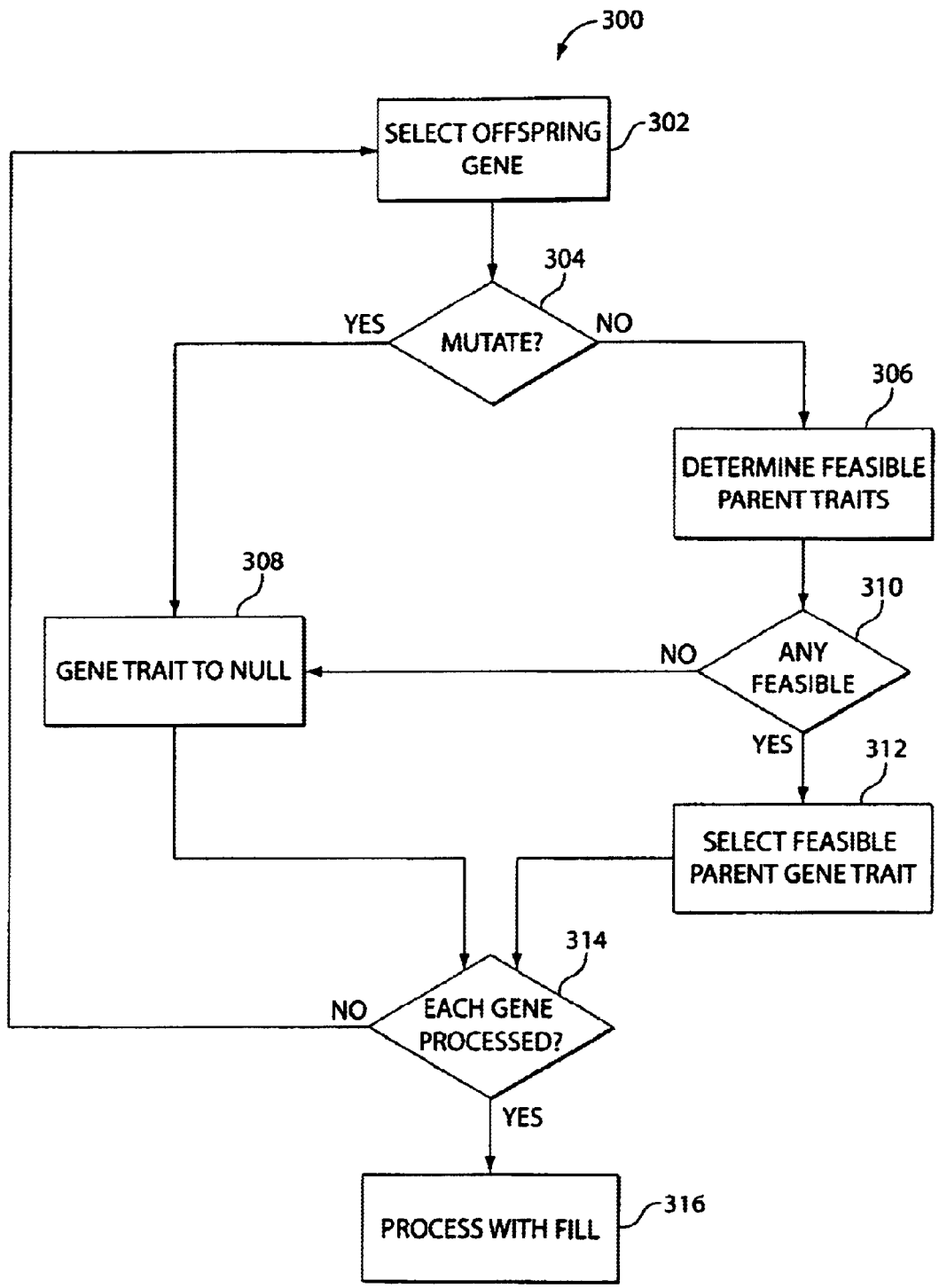
FIG. 13 is a flowchart of a process for generating offspring.

FIG. 13 illustrates a process 300 for generating offspring. Process 300 can use mutation and/or crossover to generate offspring. As described herein, both operators generate a feasible offspring (i.e., an offspring conforming to hard constraints).

After selecting one or more parents (not shown in FIG. 13), process 300 can select 302 a gene locus of a new offspring. Process 300 can probabilistically determine whether to mutate 304 the gene trait. For example, process 300 may mutate genes with probability (1/[number of genes in chromosome]). To mutate a gene, process 300 sets 308 the gene trait at the selected locus to the null trait. Determination of the gene trait may not occur until a fill process 218 post-processes 316 the chromosome. Again, fill process 218 ensures feasibility of the trait selected for the mutated gene.

Instead of mutation 308, process 300 may perform a "constrained" crossover operation on the offspring parents. The crossover operation initially determines 306 whether either parent offers a feasible gene trait for the offspring at the determined gene locus. If not 310, process 300 sets the gene to the null trait 308, again, for subsequent post-processing 316 by fill process 218. If, however, at least one of the parents provides a feasible gene trait, process 300 selects 312 an offspring gene trait from of the parent traits.

Figure 14:
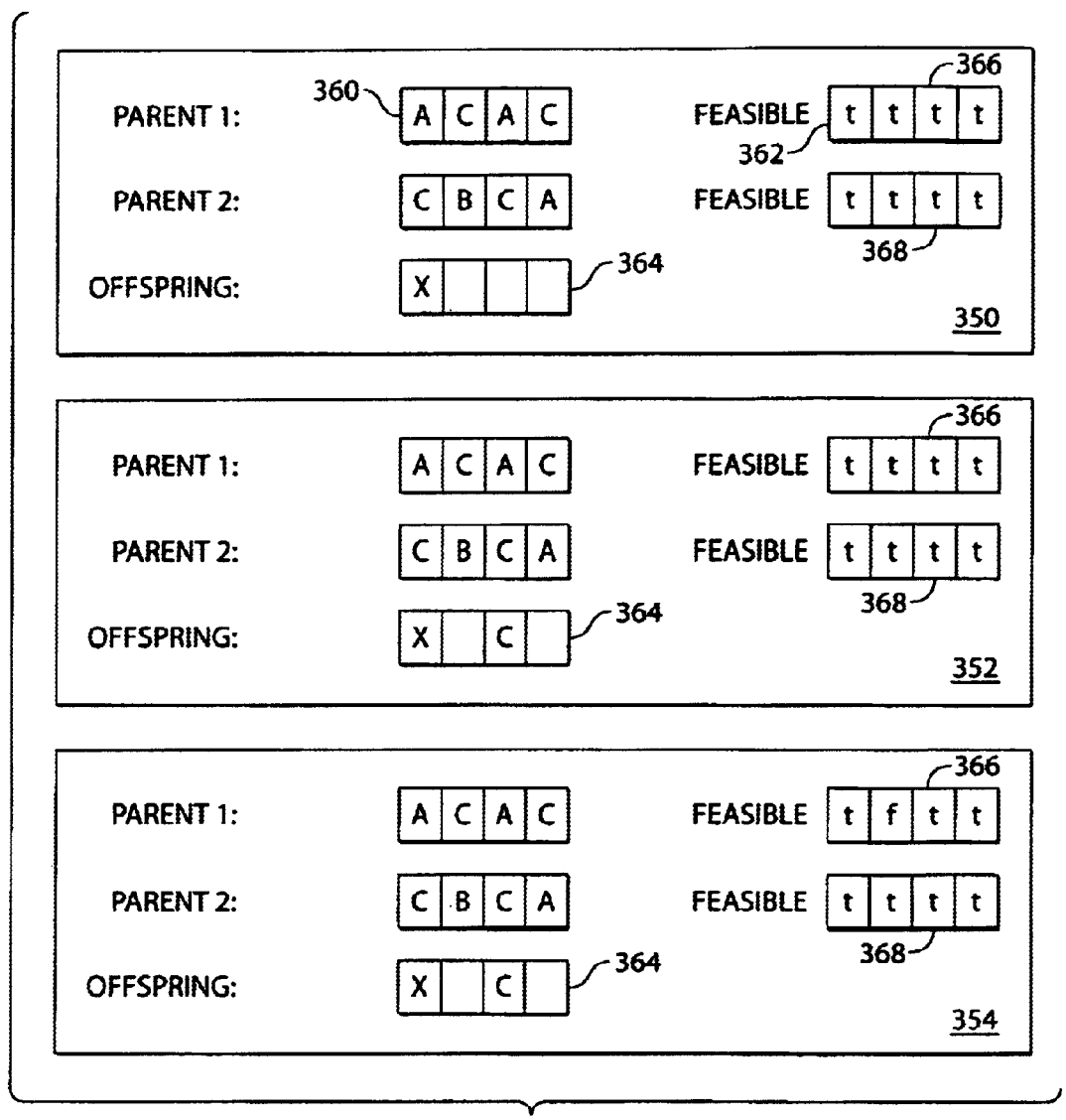
FIG. 14 is a diagram illustrating offspring generation.

FIG. 14 illustrates stages 350–354 of generating an offspring from parents. To speed identification of feasible parent gene traits, for example, during feasibility-constrained crossover, each parent, parent 1 and parent 2, has a corresponding Boolean "feasibility" vector 366, 368. Each Boolean value of a feasibility vector 366, 368 indicates the feasibility of the parent trait at the corresponding locus. For example, the first bit 362 of feasibility vector 366 indicates the feasibility of the trait, "A", of the first gene 360 of parent 1. As will be shown, feasibility vectors 366, 368 change during the determination of the gene traits of the offspring chromosome 364 to reflect changes in the feasibility of different traits.

The first stage 350 shown in FIG. 14 illustrates a mutation of the first gene of the offspring. Again, mutation can proceed by assigning the null trait to the gene for post-processing by the fill process 218. The second stage 352 illustrates constrained crossover of the gene at the third locus. As shown, the crossover operator selected resource "C" from feasible parent resources "A" and "C". As shown in the third stage 354, the selection of "C" causes a change in the feasibility vector 366 of parent 1 because the example schedule prohibits the same resource from handling both tasks 2 and 3 (see FIG. 6). Thus, trait, "C", of the second gene of the parent 1 cannot provide the trait of the second gene of the offspring 364. To reflect the infeasibility of the first parent's 360 second gene trait, feasibility vector 366 of parent 360 stores a Boolean false value in its second bit.

This process continues until each gene of the offspring has been assigned either a resource or the null trait. While FIG. 14 shows two parent chromosomes, it should be noted that more than two parents may participate in a crossover operation. Additionally, the feasibility vectors 366, 368 merely speed processing, and are not essential.

The scheduling problem shown in FIGS. 5 and 6 had a single hard constraint. That is, a feasible chromosome was any chromosome that did not schedule a resources for contemporaneous tasks.

Figure 15:
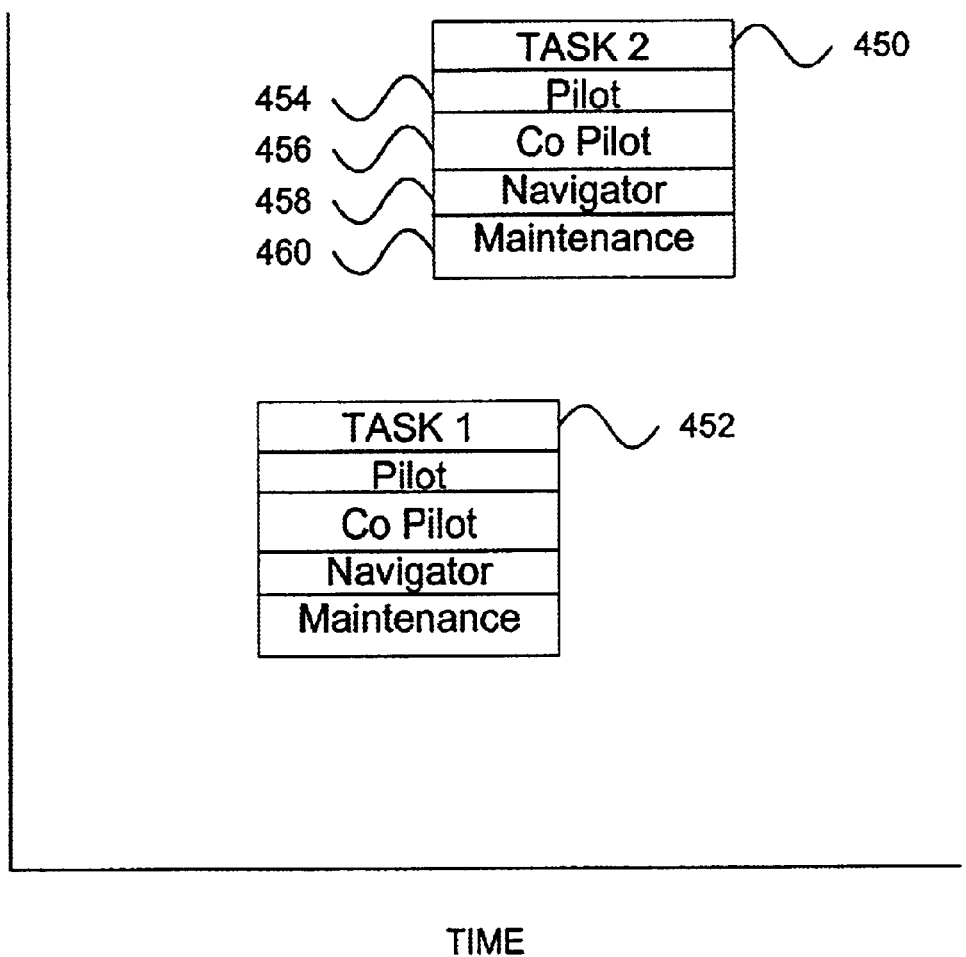
FIG. 15 is a diagram illustrating a scheduling problem.

FIG. 15 depicts a more complex scheduling problem featuring tasks 450,452 that may require more than one resource. In particular, the scheduling problem represents scheduling of flight missions. Each mission can require multiple crewmen (resources). For example, a flight can require a pilot 454, a co-pilot 456, a navigator 458, and a maintenance worker 460.

Hard constraints of such a problem may include hard constraints requiring a minimum set of crew members, qualification requirements for crewmen assigned particular duties, rest requirements for crew between flights, a cap on the hours worked over different periods of time, and so forth.

While such hard constraints govern feasibility of different gene traits, other schedule properties ("soft constraints") may affect the fitness measure of a particular chromosome. In this example, the fitness measure may be determined from a weighted sum of sub scores:

$$\text{Fitness} = w1S1 + w2s2 + \ldots + wnsn.$$

Where wn expresses a weight assigned to schedule property penalty Sn. In this scheme, a high positive values indicates poor fitness.

The scheduling properties may incorporate a wide variety of information. For example, an S value may measure how well the automated scheduler succeeds at finding a crew member to fill each position. For instance, S1 may be defined as:

$$S1 = \Sigma_{uncrewed} wp(\text{missionPriority}) * [A1 + A2*(\text{NumUncrewedPositions})]$$

where wp is a mission priority and constants A1 and A2 determine the relative importance of crew missions vs. crewing positions. If A2 is much greater than A1, the number of uncrewed positions contributes more strongly to the fitness measure than the number of crewed missions.

As another example, S2 may reflect a measure that attempts to reduce deviations from a schedule a human scheduler has approved. The fitness cost associated with S2 can vary, for example, based on whether crewman have already been notified and home much time remains before the mission begins.

Other measures may include a measure that attempts to "spread the hurt" and distribute assignments evenly among different crewman, for example, to attempt to minimize differences in hours worked. Additionally, a measure may attempt to maintain "training currency". For example, to remain current, pilots must fly a certain number of hours each month.

The fitness measure can also capture a variety of other preferences, such as "Smith does not do well flying with Jones" or "an inexperienced pilot should not fly with an inexperienced co-pilot". Each of the above may be encoded as a rule having an associated qualitative value (e.g., very bad, bad, good, very good). The qualitative values have a corresponding numerical score that can be added to the fitness measure.

Figure 16:
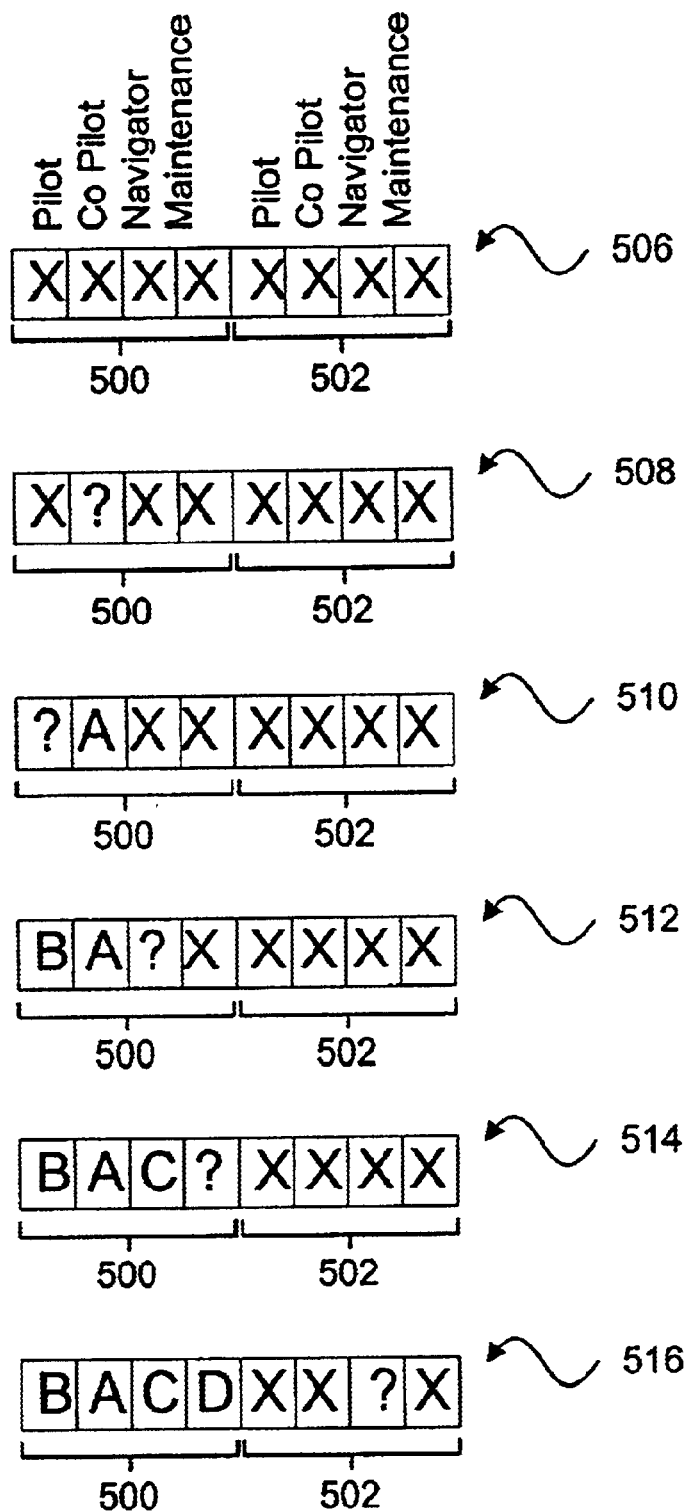
FIG. 16 is a diagram illustrating representation of a scheduling problem.

The process of determining gene traits for the chromosome may incorporate problem domain specific information. For example, FIG. 16 illustrates stages 506–516 of a chromosome being created for an assignment of resources to the two tasks 500,502. To increase the number of missions having a full crew, the process may attempt to fill missions one at a time. That is, the process may determine gene traits for genes corresponding to one of the tasks before proceeding to the next task. As shown, the process determines gene traits for the first task 500 in stages 506–514 before turning to a determination of gene traits for the second task 502 beginning with stage 516.

The scheduling system described above may be implemented as a distributed system, for example, having a server and many different clients. Such clients may feature a GUI (Graphical User Interface) that enables schedule planners to enter data, manually enter schedule information, approve or modify portions of a schedule, specify new missions, manage a roster of crewman, alter qualification requirements, and so forth. This information is stored in a database. When changes to scheduling database occur such as entry of a new mission or a change in the roster of crewmen, the genetic algorithm may await some time period before automatically starting.

Figure 17:
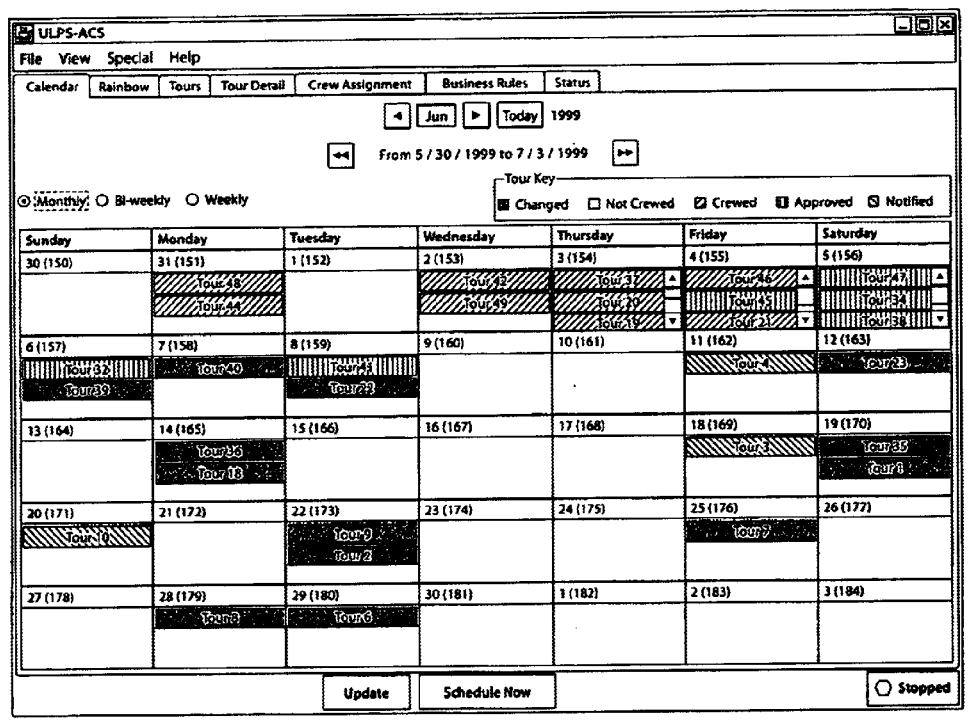
Figure 18:
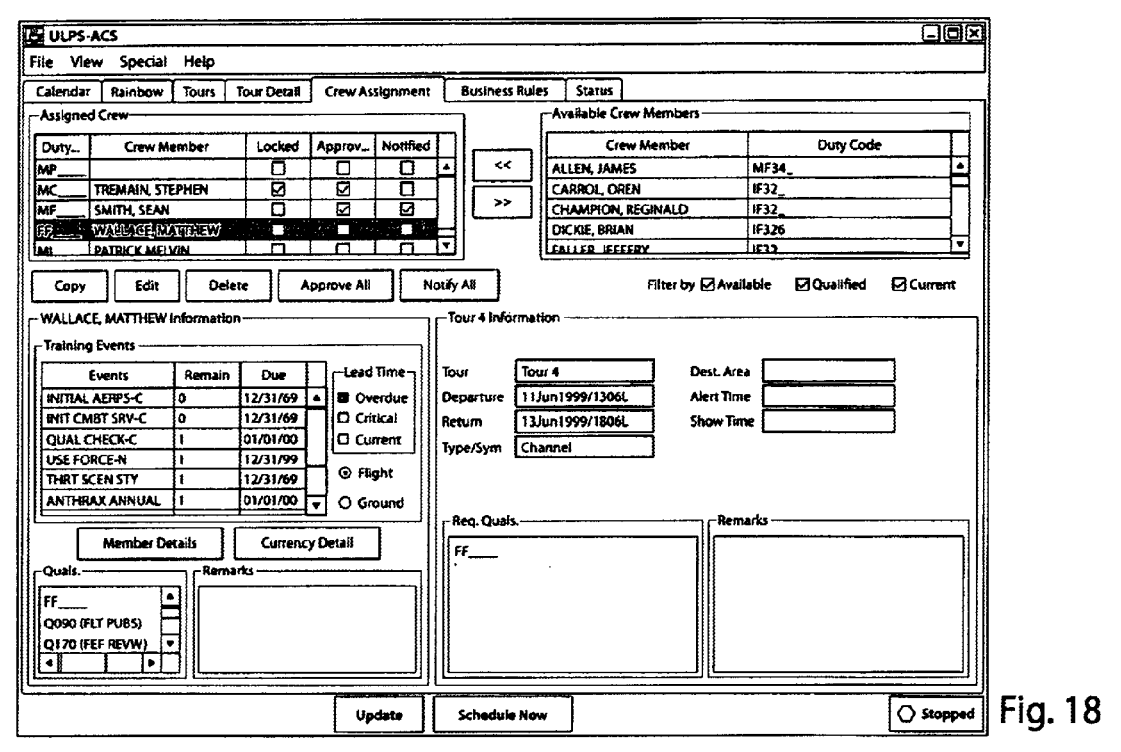
Figure 19:
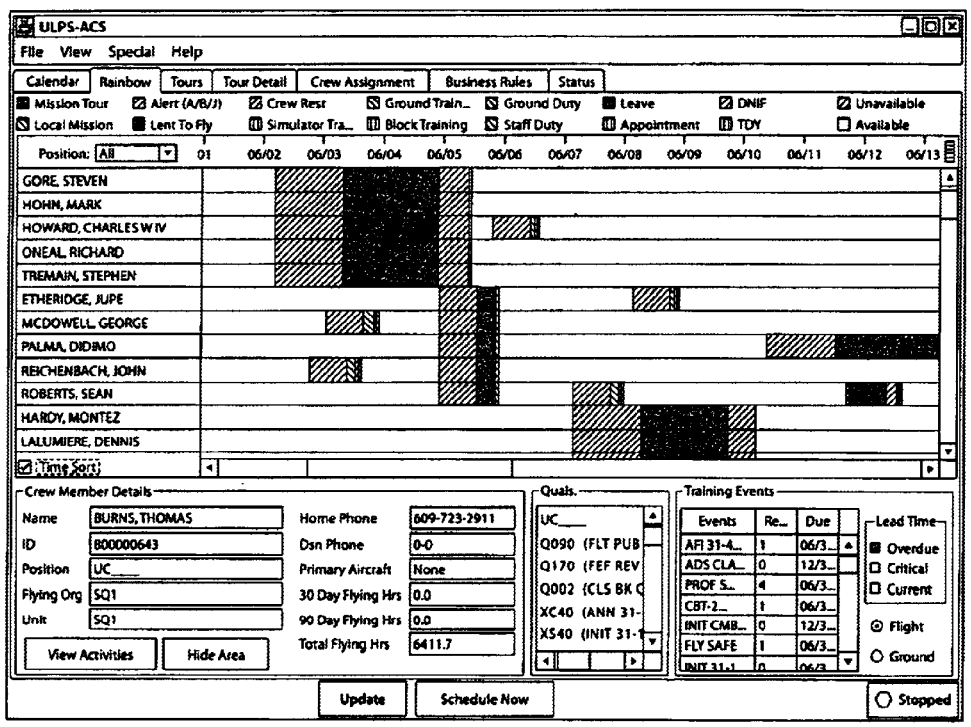

FIGS. 17–19 are screenshots of a GUI for scheduling software using genetic algorithm techniques described herein. FIG. 17 depicts a calendar that enables a user to schedule tasks (e.g., "Tours") on designated days. FIG. 18 depicts a data management screen that enables a user to view resources (e.g., "crew") assigned to a task, their qualifications, and so forth. FIG. 19 graphically depicts resource/task pairings as a color coded time graph.

Figure 20:
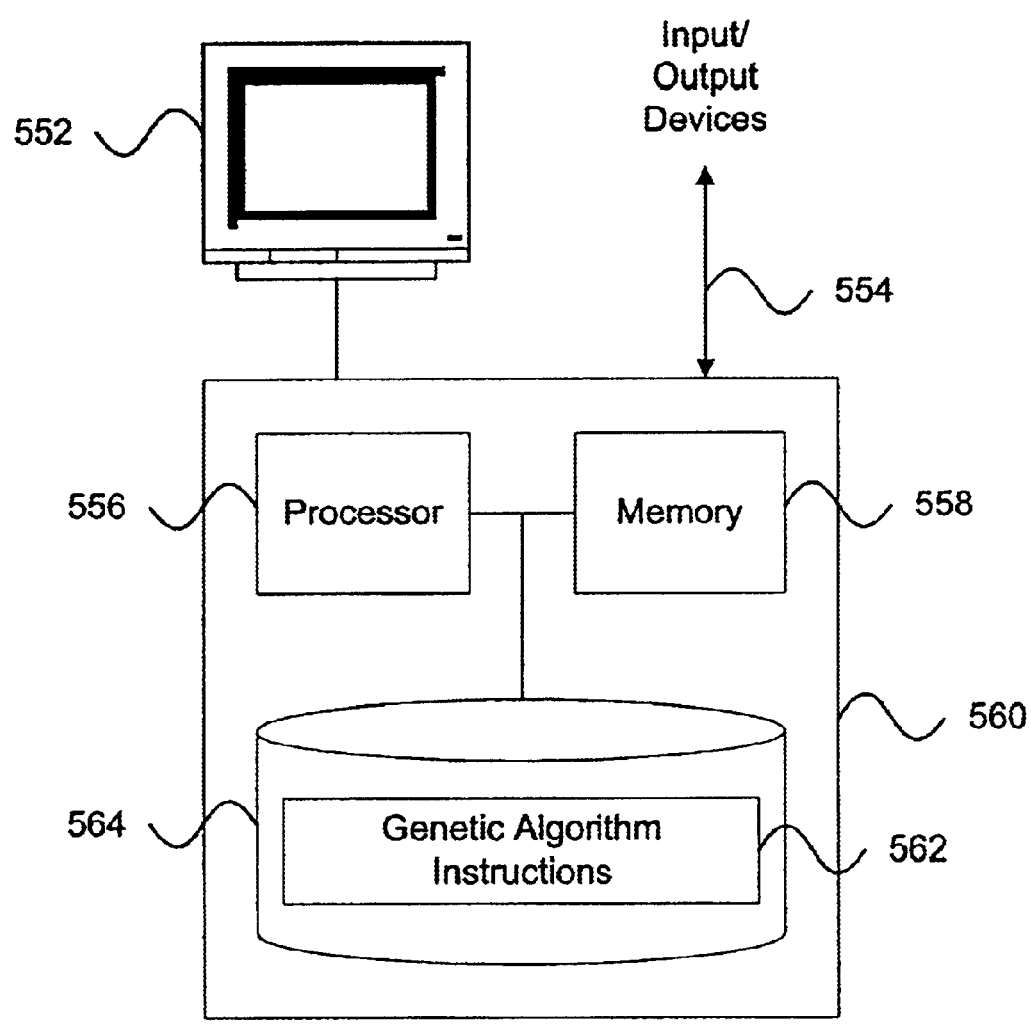
FIG. 20 is a diagram of a computer platform suitable for executing genetic algorithm instructions.

FIG. 20 illustrates a computer platform 560 suitable for executing instructions 562 implementing techniques described above. The platform 560 includes a processor 556, volatile memory 558, and non-volatile memory 564. The instructions 562 are transferred, in the course of operation, from the nonvolatile memory 562 to the volatile memory 558 and processor 556 for execution. The platform 560 may communicate with a user via a monitor 552 or other input/output device 554 such as a keyboard, mouse, microphone, and so forth. Additionally, the platform 560 may feature a network connection, for example, to distribute processing over many different platforms.

The techniques described herein are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-implemented method of determining a chromosome gene trait of an offspring, the chromosome representing an attempted solution to a problem, the method comprising:

receiving gene traits from parents of the offspring;

receiving identification of a gene locus of the offspring chromosome;

determining which, if any, of the received parent gene traits are feasible gene traits for the offspring gene at the identified locus; and if it is determined that at least one of the received parent gene traits is feasible, selecting the gene trait of the offspring chromosome at the identified locus from the determined feasible gene traits.

2. The method of claim 1, wherein the offspring chromosome expresses an assignment of resources to tasks.

3. The method of claim 2, wherein trait alleles comprise alleles specifying resources.

4. The method of claim 1, wherein determining which of the received traits are feasible comprises determining which of the received traits are feasible based on a gene trait of an offspring gene at a different locus.

5. The method of claim 1, further comprising, if none of the parent genes traits are feasible, setting the offspring gene at the identified locus to the null trait.

6. The method of claim 5, further comprising determining whether a gene trait other than the received parent gene traits is feasible.

7. The method of claim 1, wherein the parent gene traits comprise gene traits of the parent chromosomes at the identified locus.

8. A computer-implemented method of assigning tasks to resources, the method comprising:

generating a population of chromosomes, each chromosome having a sequence of genes having a trait selected from alleles that identify the resources, the loci of the genes identifying one of the tasks;

generating offspring from the generated population; and evaluating the generated offspring;

wherein evaluating offspring comprises determining a scheduling fitness measure.

9. The method of claim 8, wherein the scheduling fitness measure comprises a measure based on at least one of the following: the number of crewmen assigned to a mission, qualifications assigned to a mission, and distribution of assignments among crew-persons.

10. The method of claim 8, wherein generating offspring comprises setting a chromosome gene trait to a null trait.

11. The method of claim 10, further comprising:

identifying a chromosome gene having the null trait; and selecting feasible chromosome gene traits, if possible, for the identified chromosome gene.

12. The method of claim 8, wherein generating offspring comprises:

receiving gene traits from parents of the offspring;

receiving identification of a gene locus of the offspring chromosome;

determining which, if any, of the received parent gene traits are feasible gene traits for the offspring gene locus; and if it is determined that at least one of the received parent gene traits is feasible, selecting the gene trait of the offspring chromosome at the identified locus from the determined feasible gene traits.

13. A computer-implemented method of determining a gene trait of a chromosome that represents an attempted solution to a problem, the method comprising:

receiving an offspring chromosome having at least one gene having a null trait;

identifying at least one gene of the chromosome having the null trait; and for at least one of the at least one identified genes:

attempting to determine a feasible gene trait; and if at least one feasible gene trait is determined, setting the identified gene to one of the feasible gene traits.

14. The method of claim 13, wherein the at least one chromosome gene having the null trait comprises a gene marked for mutation.

15. The method of claim 13, wherein the at least one chromosome gene having the null trait comprises a result of an application of a crossover operation that failed to identify feasible parent gene traits for the gene.

16. The method of claim 13, wherein the chromosome comprises genes having traits selected from alleles identifying resources.

17. The method of claim 16, wherein the locus of the gene identifies a task.

18. A computer program, disposed on a computer-readable medium, for determining a chromosome gene trait of an offspring, the chromosome representing an attempted solution to a problem, the computer program including instructions for causing a processor to:
  receive gene traits from parents of the offspring;
  receive identification of a gene locus of the offspring chromosome;
  determine which, if any, of the received parent gene traits are feasible gene traits for the offspring gene at the identified locus; and
  if it is determined that at least one of the received parent gene traits is feasible, select the gene trait of the offspring chromosome at the identified locus from the determined feasible gene traits.

19. The computer program of claim 18, wherein the offspring chromosome expresses an assignment of resources to tasks.

20. The computer program of claim 19, wherein trait alleles comprise alleles specifying resources.

21. The computer program of claim 18, wherein the instructions for causing the processor to determine which of the received traits are feasible comprise instructions for causing the processor to determine which of the received traits are feasible based on a gene trait of an offspring gene at a different locus.

22. The computer program of claim 18, further comprising, instructions for causing the processor to set the offspring gene at the identified locus to the null trait if none of the parent genes traits are feasible.

23. The computer program of claim 22, further comprising instructions for causing the processor to determine whether a gene trait other than the received parent gene traits is feasible.

24. The computer program of claim 18, wherein the parent gene traits comprise gene traits of the parent chromosomes at the identified locus.

25. A computer program, disposed on a computer-readable medium, for assigning tasks to resources, the computer program including instructions for causing a processor to:
  generate a population of chromosomes, each chromosome having a sequence of genes having a trait selected from alleles that identify the resources, the loci of the genes identifying one of the tasks;
  generate offspring from the generated population; and
  evaluate the generated offspring;
  wherein the instructions for causing the processor to evaluate offspring comprise instructions for causing the processor to determine a scheduling fitness measure.

26. The computer program of claim 25, wherein the scheduling fitness measure comprises a measure based on at least one of the following: the number of crewmen assigned to a mission, qualifications assigned to a mission, and distribution of assignments among crew-persons.

27. The computer program of claim 25, wherein the instructions for causing the processor to generate offspring comprise instructions for causing the processor to set a chromosome gene trait to a null trait.

28. The computer program of claim 27, further comprising instructions for causing the processor to:
  identify a chromosome gene having the null trait; and
  select feasible chromosome gene traits, if possible, for the identified chromosome gene.

29. The computer program of claim 25, wherein instructions for causing the processor to generate offspring comprise instructions for causing the processor to:
  receive gene traits from parents of the offspring;
  receive identification of a gene locus of the offspring chromosome;
  determine which, if any, of the received parent gene traits are feasible gene traits for the offspring gene locus; and
  if it is determined that at least one of the received parent gene traits is feasible, select the gene trait of the offspring chromosome at the identified locus from the determined feasible gene traits.

30. A computer program, disposed on a computer readable medium, for determining a gene trait of a chromosome that represents an attempted solution to a problem, the computer program including instructions for causing a processor to:
  receive an offspring chromosome having at least one gene having a null trait;
  identify at least one gene of the chromosome having the null trait; and
  for at least one of the at least one identified genes:
  attempt to determine a feasible gene trait; and
  if at least one feasible gene trait is determined, set the identified gene to one of the feasible gene traits.

31. The computer program of claim 30, wherein the at least one chromosome gene having the null trait comprises a gene marked for mutation.

32. The computer program of claim 30, wherein the at least one chromosome gene having the null trait comprises a result of a crossover operation that failed to identify feasible parent gene traits for the gene.

33. The computer program of claim 30, wherein the chromosome comprises genes having traits selected from alleles identifying resources.

34. The computer program of claim 33, wherein the locus of the gene identifies a task.

* * * * *